June 11, 1935.    B. J. ANDERSON    2,004,089
HANDLE BAR
Filed Feb. 5, 1934    2 Sheets-Sheet 1

BERT J. ANDERSON
INVENTOR
BY Leon T. Hooper
ATTORNEY

June 11, 1935.                B. J. ANDERSON                2,004,089
                              HANDLE BAR
                           Filed Feb. 5, 1934          2 Sheets-Sheet 2
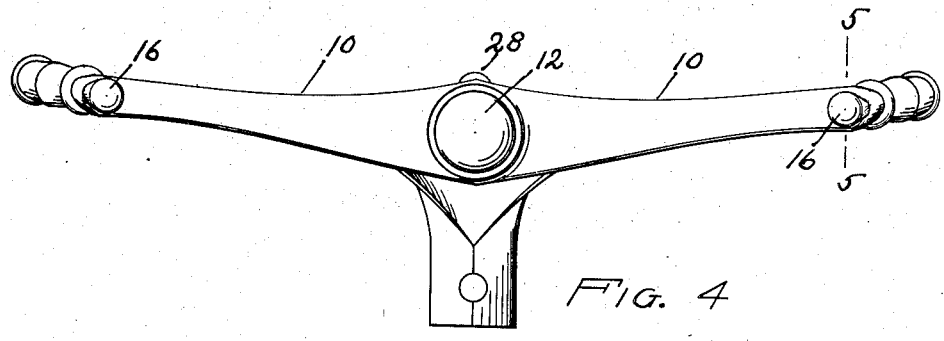
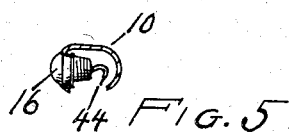
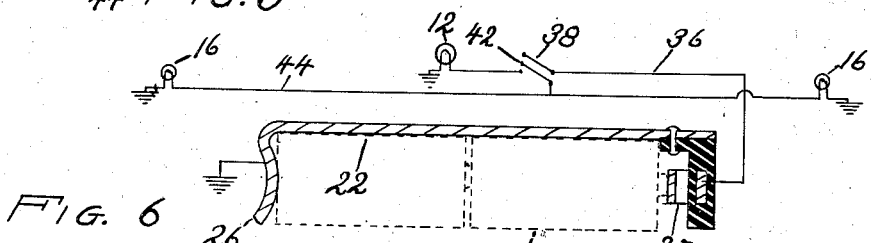
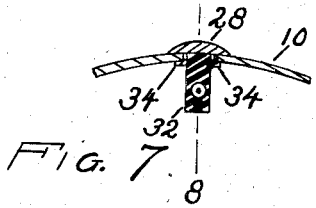
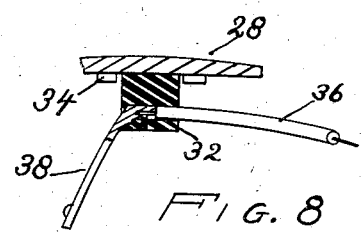
BERT J. ANDERSON
INVENTOR
BY Leon T. Hooper
ATTORNEY Patented June 11, 1935

2,004,089

UNITED STATES PATENT OFFICE 2,004,089

HANDLE BAR

Bert J. Anderson, Hammond, Ind.

Application February 5, 1934, Serial No. 709,805

10 Claims. (Cl. 208—115)

This invention relates to a handle bar construction particularly for juvenile vehicles, although the invention is applicable and may be used on other types of vehicles such as bicycles, motorcycles, and the like.

One of the principal objects of the invention resides in the provision of means for forming a streamlined handle bar from a single piece of sheet metal.

Another and further important object is the provision of means for readily disassembling the handle bar from the fork post of the vehicle to pack for shipment or storage.

Still another and further important object of the handle bar of this invention resides in the provision of means for positioning a headlight within the body of the handle bar.

A still further object of the invention resides in the provision of means for placing a parking light in each side of the handle bar slightly forward of the grip.

Another and further important object of the device of this invention resides in the provision of means for lighting the parking lights independently of the headlight.

Still another and further important object of the invention resides in the provision of means for economically constructing a sturdy and rugged vehicle handle bar having self contained headlight, parking lights and dry cell recess.

Other and further important objects of the invention will be apparent from the following specification and accompanying drawing.

The invention in a preferred form is shown in the drawing, and hereinafter more fully described.

In the drawing:

Figure 4 is a front elevation of the handle bar and shows the relative positions of the lights therein.

Figure 5 is a sectional view taken on the line 5—5 of Figure 4.

Figure 6 is a sectional view of the dry cell supporting device together with a diagrammatic plan of the electric circuits.

Figure 7 is a sectional view of a portion of the handle bar and switch member.

Figure 8 is a sectional view of a portion of the switch member taken on the line 8—8 of Figure 7.

As shown in the drawing:

Figure 1:
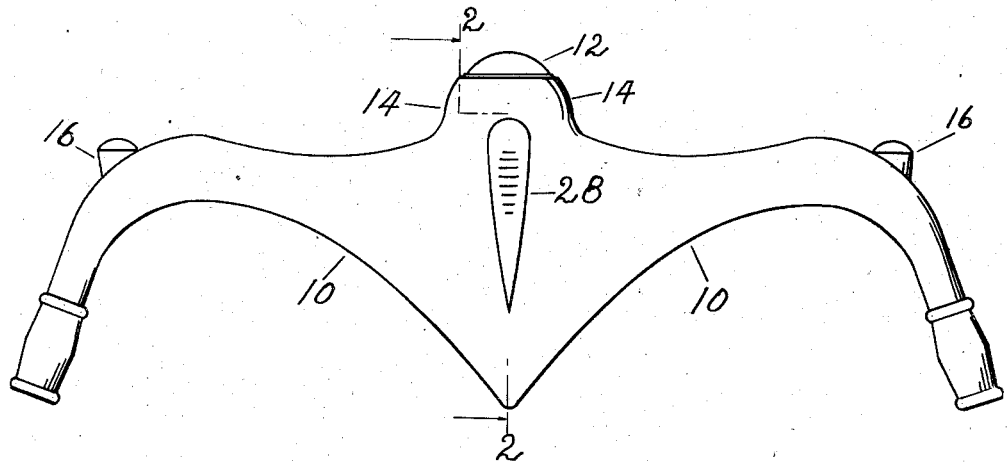
Figure 1 is a top plan view of the handle bar of this invention and shows the relative positions of the lights and switch.

The reference numeral 10 indicates in a general way the body of the handle bar, which in the preferred embodiment is constructed of a single piece of sheet metal and is extremely streamlined.

Positioned in the central front part of the handle bar 10 is an electric headlight 12. The sides of said light are formed of an expanded portion 14 of the body 10 and is shaped to limit air resistance.

An aperture in the curved portion of each side of the handle bar in front of the grip is adapted to receive an electric parking light, 16. The light may be secured in position by any suitable means.

A rectangular opening 18 in the bottom of the body 10 provides a means of access into the interior of said body for any minor repairs or necessary adjustments.

Figure 3:
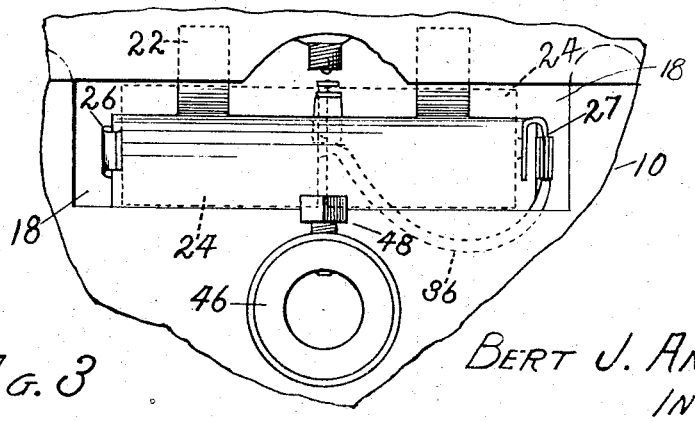
Figure 3 is a bottom view of the central portion of the handle bar with parts broken away from the edge of the opening to show the light socket and contact points.

Secured to the inner surface of the lower front section 20 of the body 10 is a clamping member 22 adapted to receive and hold a plurality of dry cells 24. This member 22 is shaped to partially encircle and grip the dry cells and has a portion cut away as is best shown in Figure 3, to allow access to the front interior of the body. Spring members 26 and 27 on the ends of the clamping member 22 hold the dry cells 24 in position and also serve as contact members in the circuit to the lights.

Slidably positioned on the upper surface of the body 10 is a switch operating member 28. A rectangular aperture 30 in the body 10 directly beneath the operating member 28 is adapted to receive the downwardly extending wire supporting member 32 and the securing members 34.

The securing members 34 which extend downwardly from the switch operating member 28 are bent outwardly on the inner surface of the body 10 and while allowing longitudinal movement of said operating member, prevent it from being turned or removed.

Figure 2:
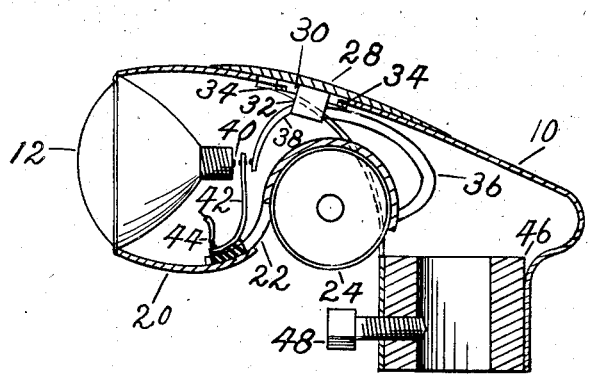
Figure 2 is a sectional view taken on the line 2—2 of Figure 1 and shows the switch operating mechanism and other related parts.

A covered wire 36 connected to the spring member 27 extends to the wire supporting member 32 and is there secured to a flexible contact 38. Provision is made at this point against grounding by insulation. The flexible contact 38 extends downwardly from the wire supporting member 32 and terminates slightly in the rear of and below the contact point 40 of the bulb in the headlight 12, as is best shown in Figure 2.

A side light contacting member 42 secured to the clamping member 22 extends upwardly to a point between the member 38 and the contact point 40. This construction may be varied and the member secured in any other suitable manner or place.

Secured to the contact member 42 is an insulated wire 44 leading to the side lights 16. It will be apparent that by moving the operating member 28 slightly forward, contact is made between the members 38 and 42, thus completing the circuit to the side lights. Continued forward movement of the operating member 22 causes the member 38 to advance the member 42 into engagement with the contact point 40 of the bulb. Thus the parking lights 16 alone, or the parking and headlight may be put into operation at will.

A bushing 46 secured to the lower portion of the body 10 provides a means for positioning the handle bar on the steering post of a vehicle. A set screw 48 is adaptable for securing the handle bar to the post.

Considerable difficulty has heretofore been encountered by manufacturers in supplying a headlight for the lower priced vehicles, especially velocipedes, on account of the prohibitive cost of the lights themselves, suitable brackets for securing the lights to the vehicle and members for carrying the necessary dry cells.

These accessories have auxiliaries and makeshift means only have been employed in their association with vehicles. This invention provides a means and sets forth a manner in which the elements may be combined to form a built-in unit which may be produced at little or no additional cost over the plain handle bar. Moreover by eliminating certain parts and enclosing other parts a superior article of manufacture, which is compact, symmetrical, rugged and sturdy, is produced.

It will be apparent from the foregoing that herein is provided a handle bar which is both sturdy and rugged, and moreover, because of its unique construction, it may be manufactured economically.

Furthermore, on account of its simplicity and the ease with which it may be attached to or removed from many kinds of vehicles, its use will be universal.

I am aware that many changes may be made and numerous details of construction varied throughout a wide range without departing from the principles of this invention, and I, therefore, do not purpose limiting the patent granted hereon otherwise than as necessitated by the prior art, and the terminology of the claims.

I claim as my invention:

1. A pressed metal vehicle handle bar containing lights, means contained within the handle bar for operating said lights, said means including a switch operating member slidably positioned on the upper central surface of the handle bar and secured to the interior surface thereof, and means for securing said handle bar to a vehicle.

2. A combination handle bar and light containing member comprising a single piece metal stamping of substantially M formation, having a substantially flat central portion and gradually restricted to terminate at each end in backwardly turned hollow cylindrical portions, grips positioned on said cylindrical portions, the edges of said stamping being turned downwardly and inwardly, a plurality of apertures in the front of said body, electric light bulbs positioned within the body directly behind said apertures, means for selectively lighting said bulbs, and a member terminating in a hollow cylinder projecting from the bottom of said stamping for removably securing the combination member to a vehicle.

3. A combination handle bar and light containing member comprising a single piece metal stamping having a wide flat central portion and terminating at each end in backwardly turned restricted cylindrical portions, grips positioned on said restricted portions, a plurality of apertures in the downwardly turned front of said stamping, electric light bulbs positioned within the body directly behind said apertures, centrally located means for selectively lighting said bulbs, and means for removably securing the combination member to a vehicle, said last named means including a bushing fixed within the bottom part of the body.

4. In a sheet metal handle bar, a plurality of electric bulbs positioned within said handle bar, a selective switch including an operating member centrally located on the handle bar, a contact point secured to said member, a second contact point positioned in operable alignment with said first named contact point and connected in circuit with certain of said bulbs, and a third contact point positioned in operative alignment with said second contact point and in circuit with a bulb not connected with said second contact point.

5. A combination handle bar and light bracket comprising a sheet metal body, the forward edge of said sheet metal body being turned downwardly and inwardly, lights for directing rays in a predetermined direction positioned within the downwardly curved portion of said body, and means for operably securing the handle bar to a vehicle.

6. A combination handle bar and light bracket comprising a stamped sheet metal body, apertures in said body, electric lights positioned in said apertures, outwardly extending members on each side of said body and integral therewith, said members being curved rearwardly and being restricted to form cylindrical grip supporting ends, and a single member for securing the lights and handle bar to a vehicle.

7. A combination handle bar and light containing member comprising a sheet metal body, integral members extending outwardly from each side of the body and gradually restricted and shaped to form rearwardly disposed hollow cylindrical ends, the edges of said body being turned downwardly and inwardly, apertures in the front portion of said body, electric lights positioned within said apertures, means for removably securing a plurality of dry cells within said body, means for conducting an electric current from said dry cells to the lights and means for adjustably securing the handle bar to the fork post of a vehicle.

8. A combination handle bar and light containing member comprising a sheet metal body, an integral member extending outwardly from each side of the body and gradually restricted and shaped to form rearwardly disposed hollow ends, a relatively large aperture in the central front portion of said body, a smaller aperture on each side thereof, electric bulbs positioned within said apertures, a centrally located member for lighting the bulbs in the smaller apertures independently of the bulb in the large aperture, and means for securing the combination member to a vehicle.

9. A combination handle bar and light containing member comprising a single piece sheet metal stamping of substantially M formation, tapering from the center portion to terminate at each end in backwardly turned cylindrical portions, a grip positioned on each of said restricted portions, the remaining edges of said body being turned downwardly and inwardly, electric bulbs positioned within said body, and means for lighting said bulbs within said body, the rear central under portion of said handle bar being gradually restricted to form a downwardly extending hollow cylindrical member.

10. A combination handle bar and light containing member comprising a single piece sheet metal body having a wide central portion and terminating at each end in backwardly turned restricted cylindrical portions, the edges of said body being turned downwardly and inwardly, electric bulbs positioned within said body, and means within said body for lighting bulbs, the rear central under portion of said handle bar being gradually restricted to form a downwardly extending hollow cylindrical member adapted to be removably positioned on a steering post.

BERT J. ANDERSON.